United States Patent [19]
Greenway

[11] Patent Number: 5,546,217
[45] Date of Patent: Aug. 13, 1996

[54] LASER SCANNING APPARATUS

[75] Inventor: Warren C. Greenway, Cambridge, Id.

[73] Assignee: Decagon Devices, Inc., Pullman, Wash.

[21] Appl. No.: 147,399

[22] Filed: Nov. 5, 1993

[51] Int. Cl.$^6$ .................................................. G02B 26/08
[52] U.S. Cl. ........................ 359/223; 359/196; 359/225; 359/226
[58] Field of Search ................................. 359/196–197, 359/216–220, 201, 212, 214, 223, 225, 226; 250/235–236; 235/462, 467, 472

[56] References Cited

U.S. PATENT DOCUMENTS

| | | | |
|---|---|---|---|
| 2,758,502 | 8/1956 | Scott et al. | 88/14 |
| 3,063,332 | 11/1962 | Fajans | 88/2.4 |
| 3,350,978 | 11/1967 | Alers | 88/14 |
| 3,643,402 | 2/1972 | Wireman . | |
| 3,652,844 | 3/1972 | Scott, Jr. | 240/1 |
| 3,733,133 | 5/1973 | Chapman | 359/220 |
| 4,025,193 | 5/1977 | Pond et al. | 356/5 |
| 4,154,507 | 5/1979 | Barr | 350/174 |
| 4,277,170 | 7/1981 | Miles | 356/152 |
| 4,364,183 | 12/1982 | Rhodes | 33/268 |
| 4,387,297 | 6/1983 | Swartz et al. . | |
| 4,409,470 | 10/1983 | Shepard et al. | 235/472 |
| 4,556,278 | 12/1985 | Schell | 359/216 |
| 4,568,825 | 2/1986 | Wurster | 250/202 |
| 4,572,662 | 2/1986 | Silverman | 356/5 |
| 4,647,761 | 3/1987 | Cojan et al. | 250/203 |
| 4,850,687 | 7/1989 | Reis et al. | 350/486 |
| 4,866,464 | 9/1989 | Straayer | 250/235 |
| 4,871,904 | 10/1989 | Metlitsky et al. | 359/212 |
| 5,100,229 | 3/1992 | Lundberg et al. | 356/1 |
| 5,137,354 | 8/1992 | deVos et al. | 356/152 |
| 5,146,463 | 9/1992 | Rando | 250/235 |
| 5,148,008 | 9/1992 | Takenaka | 359/196 |
| 5,214,531 | 5/1993 | Torii et al. | 359/197 |
| 5,258,822 | 11/1993 | Nakamura et al. | 356/141 |
| 5,272,353 | 12/1993 | Barkan et al. | 250/235 |
| 5,298,729 | 3/1994 | Wike, Jr. | 359/216 |
| 5,321,259 | 6/1994 | Morgan | 250/236 |

Primary Examiner—Paul M. Dzierzynski
Assistant Examiner—Darren E. Schuberg
Attorney, Agent, or Firm—Foster & Foster

[57] ABSTRACT

A laser scanning apparatus includes generally a handle assembly, a staff segment, a scanner section, and a base. The scanner section includes a scanner assembly which rotates and causes a beam of laser light projected onto a reflector to move in a generally upward spiral path to scan a conical section to detect and measure objects surrounding the laser scanning apparatus.

33 Claims, 6 Drawing Sheets

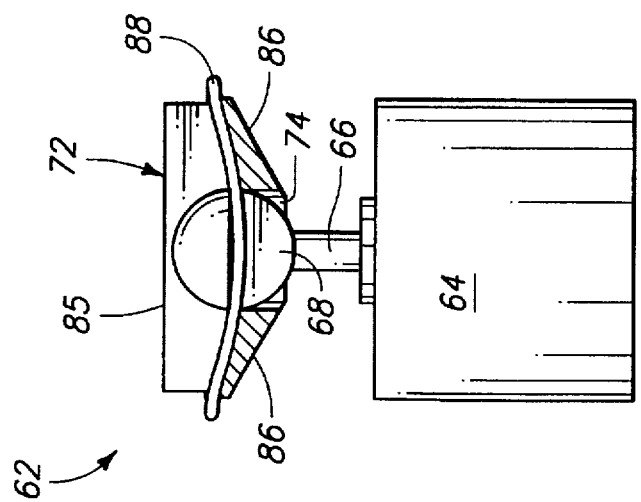
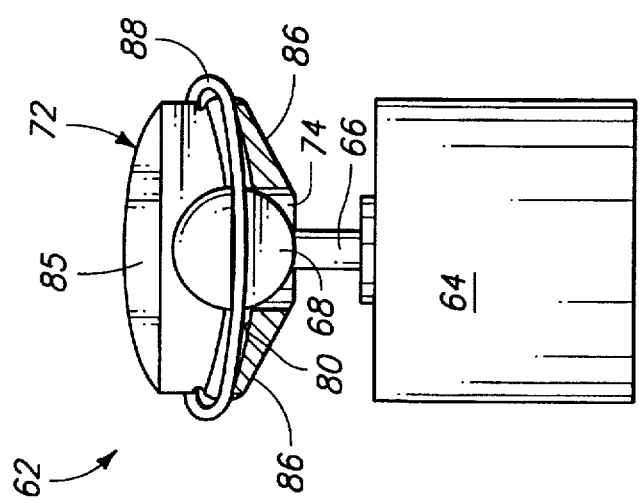
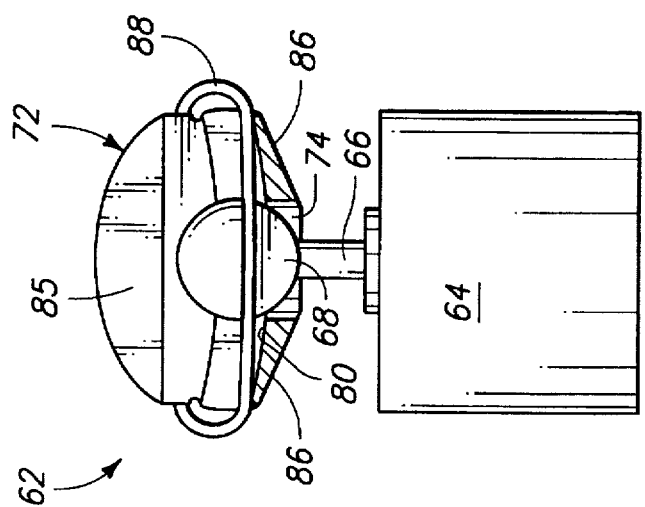

5,546,217

1

LASER SCANNING APPARATUS

TECHNICAL FIELD

This invention relates to scanning devices, and more particularly, to laser scanning devices.

BACKGROUND OF THE INVENTION

Scanning devices have traditionally been used for a variety of purposes. For example, scanning devices can be used to measure the distance to a particular object, and to detect the presence of an object located within the scanning area. Scanning devices can also be used as an integral part of an electronic component, and can monitor a known environment to detect and measure changes to that environment. The potential uses for scanning devices is virtually unlimited.

Many different scanners, particularly laser scanners, have been developed in recent times. Many scanners are capable, however, of scanning only in a single plane. Where scanning is done in multiple dimensions, multiple drive mechanisms or motors (e.g., a rotational drive motor and a vertical tilt motor) are used to project the beam of laser light in various directions.

One particular need for a suitable scanning device exists with respect to measuring plant and forest canopies. The biomass production of plants is proportional to the radiation from the sun absorbed by the plant leaves. Measuring the density of a plant canopy will provide information with respect to how much light a canopy intercepts. Use of a scanning device to measure the canopy enables statistical data to be generated and compiled to determine optimal spacing of plants, optimal thinning of timber, soil erosion effects, and many other aspects that affect the environment surrounding plant growth.

A few rudimentary types of canopy measuring methods are known. One prior method of measuring a plant canopy involves inserting a rod through a plant canopy and determining if it strikes any leaves. This method of measuring provides at least some type of data by which the probability of hitting the plant canopy could be determined. Another known method involves placing an array of photodiodes on the ground under the plant growth to detect the amount of sun light which passes through the canopy, somewhat similar to the rod described above. With each of these methods, the plant canopy is determined by an inversion calculation of penetration by the rod or sun light through the plant canopy. No direct measurements of the plant canopy are taken. Still another method involves using a manual, linear laser detector to detect and measure plants from the location of the operator.

The foregoing methods have several drawbacks and disadvantages. Among others, they are difficult to implement, imprecise, and do not allow sufficient, reliable data to be obtained to make an accurate determination as to the plant canopy.

There exists a need, therefore, to develop a scanning device for all around use that can directly measure and detect objects in an area immediately surrounding the scanning device. There is also a need to develop a lightweight, portable scanning device capable making extremely fast and accurate direct measurements of objects, particularly plant and forest canopies.

The present invention involves a laser scanning apparatus which can be used in a variety of applications to directly measure and detect objects surrounding the scanning apparatus. The laser scanning apparatus is portable and particularly suited for scanning a plant canopy. The various objects, features, and advantages of the invention will become apparent from the detailed disclosure which follows.

BRIEF DESCRIPTION OF THE DRAWINGS

Preferred embodiments of the invention are described below with reference to the accompanying drawings, which are briefly described below.

FIGS. 5–7 are sequential side elevation views of the scanner assembly of FIG. 1 showing a platen assembly as it pivots from an inclined initial position, to a middle interim position, and to a horizontal final position;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
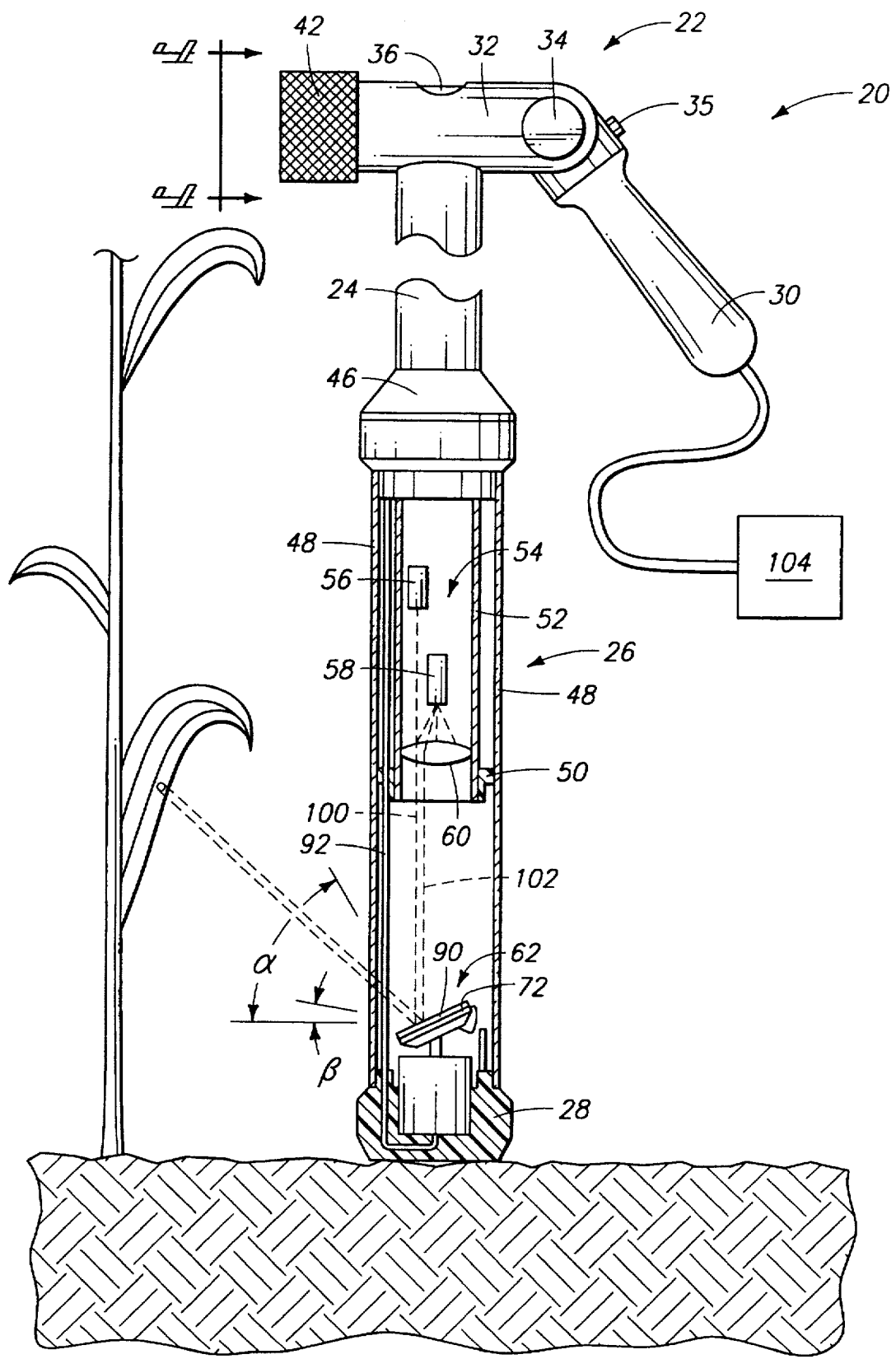
FIG. 1 is a side elevation view, partly in section, of a laser scanning apparatus according to the present invention.
Figure 2:
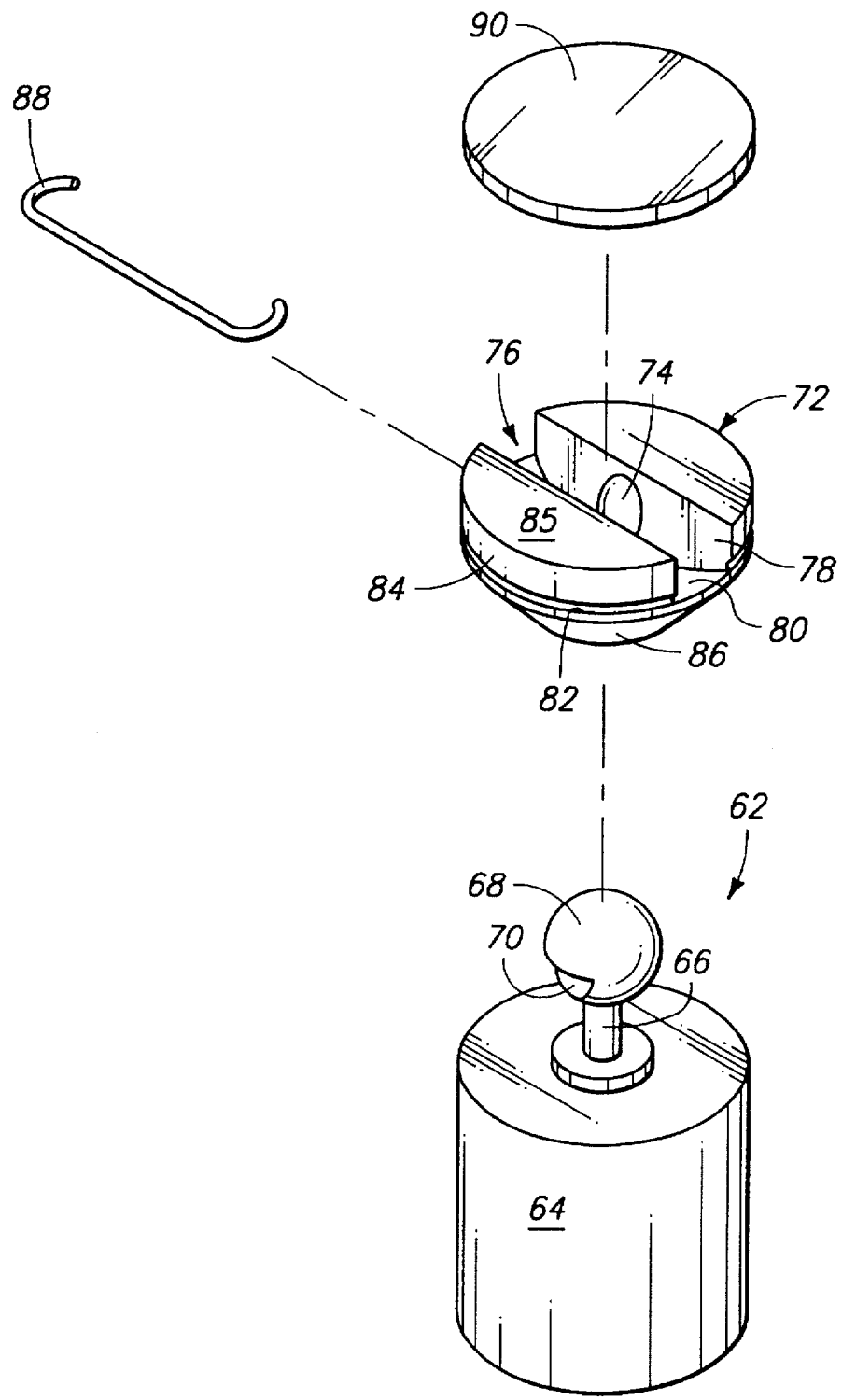
FIG. 2 is an exploded view of a scanner assembly incorporated into the laser scanning apparatus of FIG. 1.
Figure 3:
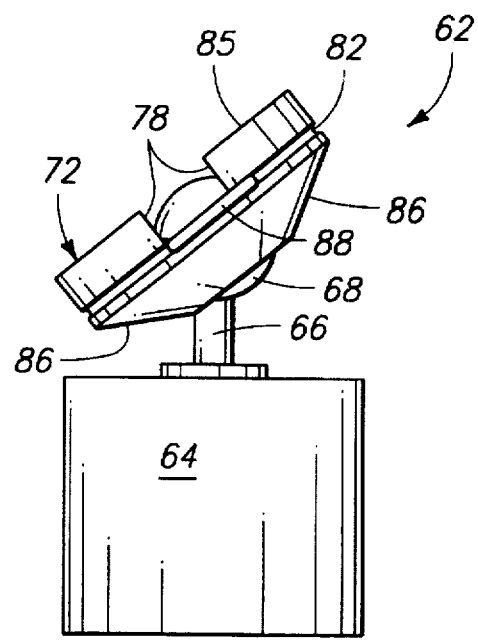
FIG. 3 is a side elevation view of the scanner assembly of FIG. 1.

FIG. 1 shows a laser scanning apparatus 20 for use in directly detecting and measuring surrounding objects. The scanning apparatus can potentially be used in an unlimited number of applications. The laser scanning apparatus is particularly suitable for scanning a plant or forest canopy.

Referring still to FIG. 1, the laser scanning apparatus 20 generally comprises a lightweight, portable housing unit which includes a handle assembly 22, a staff segment 24, a scanner section 26, and a base 28. A control unit 104 is operatively coupled to the laser scanning apparatus for supplying power to the apparatus, storing data generated by the apparatus, and compiling and processing the data. The control unit is portable, along with the scanning apparatus, and can easily be utilized by the scanning apparatus operator.

The handle assembly 22 comprises an ergonomic handle portion 30 pivotally coupled to a top member 32 at pivot point 34. The ergonomic handle portion can be adjusted by pivoting the handle portion relative to the top member 32. Typically, the handle portion 30 will be appropriately positioned to suit the particular individual using the laser scanning apparatus. A scan button 35 is located on the top of the handle portion for activating a scanning cycle of the apparatus.

The top member 32 is coupled to the top end of the staff segment 24 to form the uppermost portion of the laser scanning apparatus 20. The top member of the handle assembly includes a leveling device in the form of a bubble level 36 at center of the top surface of member 32. The operator can reference the leveling device to ensure that the laser scanning apparatus 20 is plumb during scanning so that accurate data can be generated.

Figure 4:
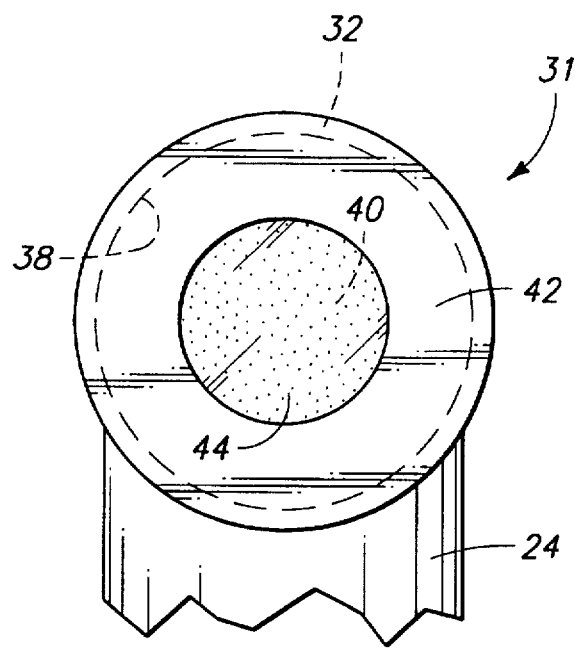
FIG. 4 is a front view of a desiccant containment portion of the laser scanning apparatus of FIG. 1.

FIG. 4 shows a front view of the top member 32 including a desiccant containment portion 31. More specifically, the top member defines a chamber 38 in which a desiccant material 40 can be placed. A filter (not shown) prevents the desiccant material 40 from entering into the staff segment 24 of housing unit, but permits any moisture within the staff segment or scanning section to enter into the chamber 38 to be absorbed by the desiccant material. An end cap 42 is threadedly coupled to an end of the top member 32 hold the desiccant material 40 within the chamber 38. A viewing port in the form of a glass viewing window 44 is incorporated into the end cap 42 so that a color change in the desiccant material can be observed. Such a color change would indicate that the desiccant material has absorbed all of the moisture it is capable of absorbing and therefore must be changed.

Referring again to FIG. 1, the staff segment 24 is coupled to and extends downwardly from the top member 32. The staff segment is generally cylindrical in shape. The length of the staff segment 24 determines the length of the scanning apparatus. In one embodiment, the total height of the laser scanning apparatus from the base 28 to the top member 32 will be approximately between three and four feet. The length of the laser scanning apparatus 20 could be varied with little difficulty, however, by changing the length of the staff segment 24.

The staff segment 24 is interconnected with the scanner segment 26 by means of a tapered transition piece 46. A tubular glass portion 48 extends between the transition 46 and the base 28. A laser optic assembly housing 52 is mounted in the upper portion of the scanner segment 26, between a middle support member 50 and the transition piece 46. A laser optic assembly 54 is contained within the housing 52, which is generally cylindrical and nontransparent. The laser optic assembly 54 comprises a transmitter 56 for transmitting a beam of laser light, a detector 58 for detecting return diffuse light, and a dual convex lens 60 for focusing the return diffuse light on the detector.

Figure 8:
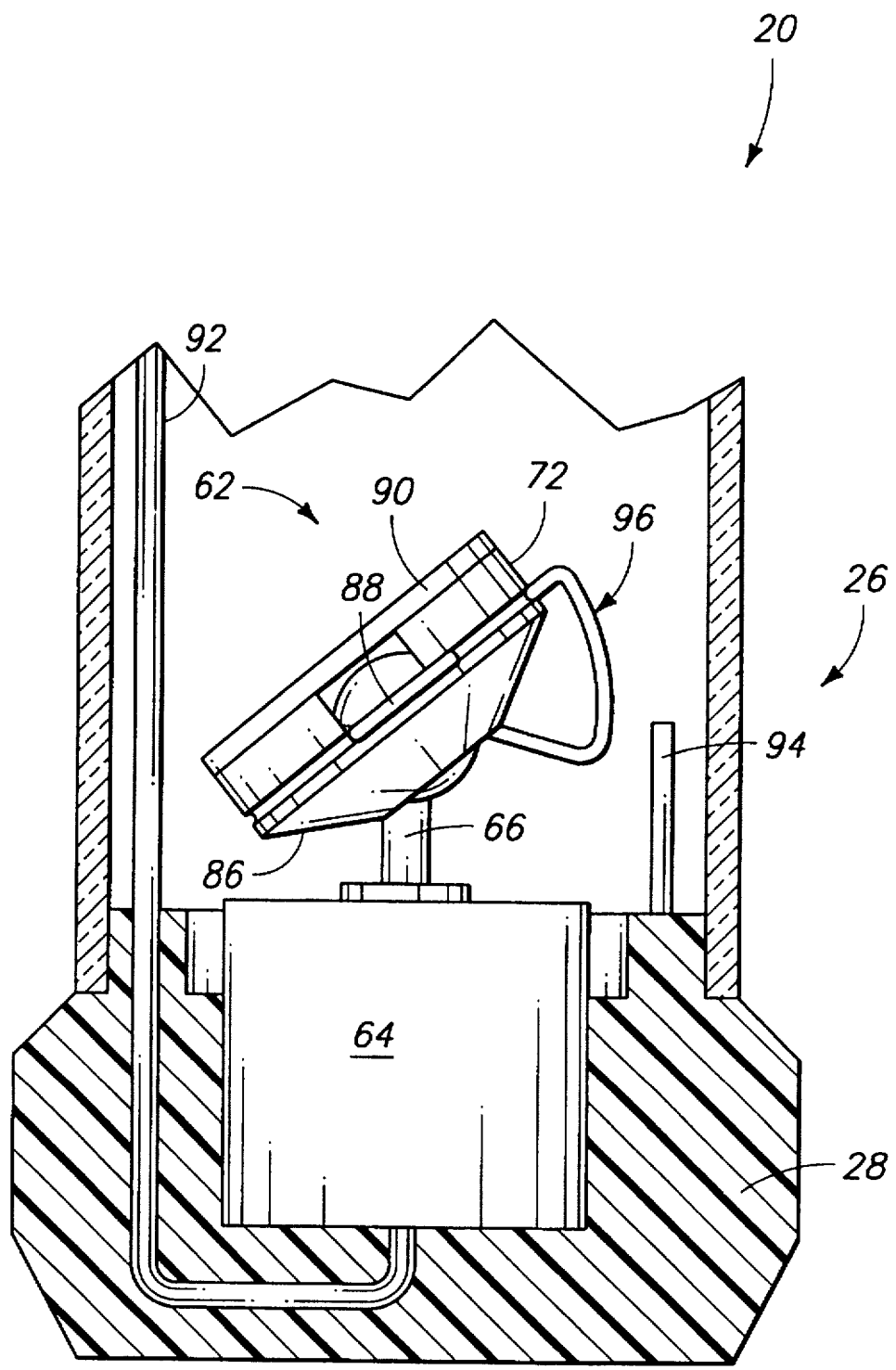
FIG. 8 is a side elevation view, partly in section, of the scanner assembly mounted within the laser scanning apparatus of FIG. 1.
Figure 9:
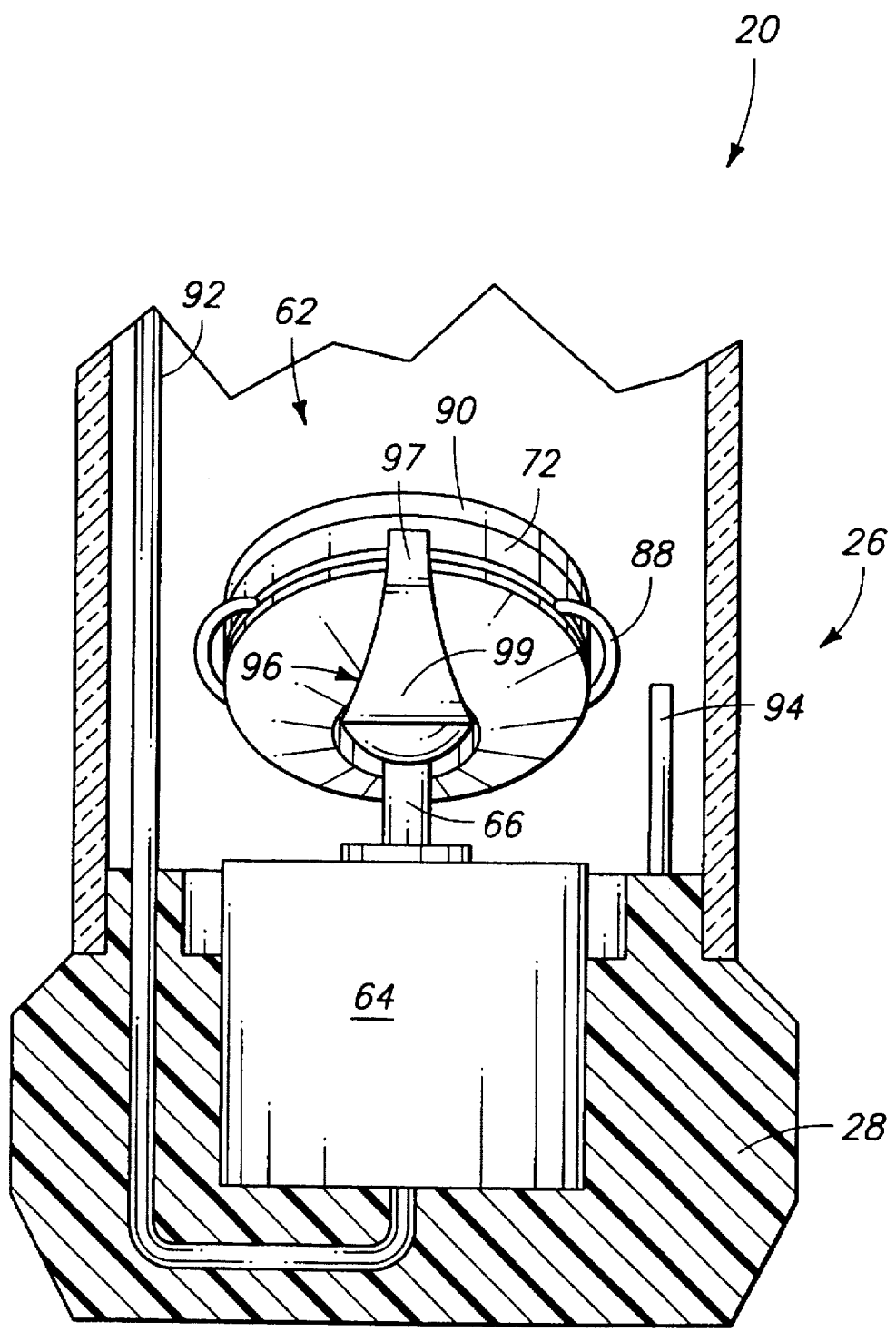
FIG. 9 is a side elevation view, partly in section, of the scanner assembly mounted with in the laser scanning apparatus of FIG. 1 with the platen rotated 90° as compared to FIG. 8.

FIGS. 2–3 and 5–6 show the components of the scanner assembly 62. FIGS. 8–9 show the scanner assembly 62 as it is mounted within the base portion 28. Generally, the scanner assembly 62 comprises a platen assembly 72, an electric motor 64, and a rotatable shaft 66 interconnecting the platen assembly and the motor. More specifically, a ball portion 68 is integrally formed on an end of shaft 66 opposite the motor. The ball portion 68 defines a transverse wedge-shaped slot or groove 70 on one side of its lower half. The slot 70 is used for attaching a platen assembly 72 (discussed below) to the ball portion 68.

The platen assembly 72 is pivotally mounted on the ball portion 68 of the shaft 66. The platen assembly 72 generally includes a top platen surface 85, a peripheral edge surface 84, and a bottom tapered surface 86 which converges downwardly toward the shaft 66. The platen assembly further defines a socket portion 74 (FIG. 2) for receiving the ball portion 68. The socket portion 74 and ball portion 68 form a ball-and-socket connection which allows movement of the platen assembly relative to shaft. The platen also defines a central transverse slot 76 (FIG. 2) defined by opposed parallel sidewalls 78 (only one shown in FIG. 2) and an arcuate bottom surface 80. The platen still further defines an annular groove 82 formed in a peripheral surface 84 of the platen assembly 72.

A biasing member in the form of a spring clip 88 retains the platen assembly 72 mounted upon the ball portion 68. The spring clip is positioned underneath the wedge shaped slot 70 and rests against the bottom surface 80 of the slot 76 (FIGS. 5–7). The extreme ends of the spring clip are retained within the annular groove 82. When the spring clip flexes, which occurs when the platen assembly 72 pivots relative to the shaft 66, the ends slide back and forth (but remain retained within) the groove 82.

A reflector 90 (FIGS. 8 and 9) is attached to the top surface 85 of the platen assembly 72 such that the reflector lies in a plane substantially parallel to the plane of the top surface 85 of the platen assembly 72. Any suitable reflector may be used in connection with the present invention.

FIGS. 5–7 show various movements of the platen assembly 72 as it progresses through a scanning cycle. FIG. 5 shows the starting or rest position of the platen assembly 72 wherein the spring clip 88 urges the platen assembly toward an initial inclined position. In this position, the edge where bottom surface 86 intersects with the socket 74 abuts the shaft 66.

As the shaft 66 and attached ball portion 68 are rotated by motor 64, a centrifugal force is exerted upon the platen assembly 72 which causes the platen assembly to pivot upwardly relative to the shaft toward a partially inclined position (or middle interim position) of the platen assembly (FIG. 6). In so doing, the centrifugal force causes the platen assembly to overcome the biasing force of the spring clip 88. As the platen assembly 72 is urged toward a horizontal position, the bottom of the spring clip 88 flexes and moves toward the arcuate bottom surface 80. The spring clip acts as a type of hinge for restricting movement of the platen assembly to one degree of freedom. At a horizontal final position of the platen assembly, which occurs half way through one scanning cycle, the spring clip 88 engages substantially the entire arcuate surface 80 of the platen assembly, as shown in FIG. 7. This position of the platen assembly 72 occurs when the shaft 66 rotates faster than a predetermined rotational speed to overcome the biasing force of the spring clip 88.

Once the substantially horizontal final position is achieved (FIG. 7), the rotational speed of the shaft 66 begins to decrease which causes the spring clip 88 to overcome the centrifugal force and urge the platen assembly 72 back toward its initial inclined position, as shown in FIG. 5.

As a result of the platen movement described in connection with FIGS. 5–7, a beam of laser light projected onto the reflector 90 attached to the top surface 85 of the platen assembly 72 will cause the scanner to scan a conical section. As the reflector rotates and overcomes the biasing force, the reflected beam of laser light travels incrementally upward in a spiralling conical path. One full scanning cycle can be accomplished in a few seconds, which allows the scanning apparatus to be hand operated. The platen assembly construction allows the platen assembly to scan a conical section with a single drive motor.

FIGS. 8 and 9 show the scanner assembly 62 mounted within the base 28. The glass cylinder 48 encloses the scanner assembly 62 so that the beam of laser light can pass through the glass closure. A suitable reflector 90 is mounted on top of the platen assembly 72 to reflect the beam of laser light toward objects to be measured and return diffuse light back toward the laser optic assembly. The size of the mirror may vary, depending upon the amount of return diffuse light that must be gathered and reflected to the detector 58. A conduit 92 extends from the transition piece (FIG. 1) to the base 28 to house lead wires passing from the control unit 104 to the electric motor 64. A Hall effect sensor 94 is mounted to the base 28 adjacent the scanner assembly 62 for measuring the rotational speed of the platen assembly 72. A tapered metal piece 96 is coupled to the platen assembly 72 which is detected when it passes the sensor 94. The metal piece has a relatively thin top section 97 and a relatively thick bottom section 99 to allow the sensor to detect the angle of inclination of the platen assembly. Therefore, both the speed of rotation and the degree of tilt is measured by sensor 94.

In operation, the laser scanning apparatus 20 is positioned on the ground within the forest or plant canopy to be measured, as shown in FIG. 1. Referring to the bubble level 36, the operator insures that the device is plumb before activating the scanner. Because the device is hand held, and not stationary, it must be able to measure with extreme speed. The scanner is activated by depressing scan button 35 which causes the emission of consecutive laser bursts in the form of a beam of laser light 100 from the transmitter 58 onto the reflector 90. Bursts of laser light beams 100 are transmitted approximately every 85 microseconds. The beam of laser light 100 passes through an aperture (not shown) in the dual convex lens 60 and projects directly onto the reflector 90.

Simultaneous with activating the bursts of laser light, the platen assembly 72 rotates. This causes the beam of laser light to scan in a circle, initially at an initial position angle β (approximately 10° from the horizontal). As the platen assembly 72 continues to rotate and increase in rotational speed, an increasing centrifugal force is exerted upon the platen assembly 72 which causes the platen assembly to overcome the biasing force of the spring clip 88. This causes the beam of laser light to scan in an upward spiralled path, eventually reaching a maximum position angle α (in which the top surface 85 of the platen assembly 72 corresponds substantially to a position perpendicular to the motor axis). This sequence is shown in FIGS. 5–7.

During scanning the moving beam of laser light will strike any objects within the scanning radius, and return diffuse light will be reflected back onto the reflector 90, which will direct the diffuse light through the dual convex lens 60. The lens 60 focuses the diffuse light at the detector 58 for detection and measurement of objects within the scanning area. The microprocessor control unit 104 collects and compiles data received from the detector 58 and the Hall effect sensor 94 for use in analyzing the presence of objects surrounding the laser scanner.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A laser scanning apparatus, comprising:
   a laser optic assembly transmitting a beam of laser light and detecting return diffuse light;
   a scanner assembly including a housing and a reflector mounted within the housing, the reflector being positioned at an angle of inclination relative to the housing to reflect the beam of laser light toward objects located in a conical scan section and to reflect return diffuse light from the objects back to the laser optic assembly, the scanner assembly configured to move the reflector through complete rotations while simultaneously changing the angle of inclination of the reflector relative to the housing to reflect the beam of laser light in a spiralling path to scan an area within the conical section.

2. A laser scanning apparatus, comprising:
   a laser optic assembly transmitting a beam of laser light and detecting return diffuse light;
   a scanner assembly including a reflector positioned at an angle of inclination to reflect the beam of laser light toward objects located in a conical section and to reflect return diffuse light from the objects back to the laser optic assembly, the scanner assembly configured to move the reflector through complete rotations while simultaneously changing the angle of inclination of the reflector to reflect the beam of laser light in a spiralling path to scan the conical section, wherein the scanner assembly comprises:
   a rotatable shaft;
   drive means for rotating the shaft;
   a platen assembly having a top surface pivotally coupled to the shaft;
   the reflector being mounted upon the top surface of the platen assembly;
   a bias member exerting a biasing force on the platen assembly to urge the platen assembly toward an initial inclined position when the shaft is stationary, wherein rotation of the shaft generates a centrifugal force which causes the platen assembly to pivot relative to the shaft thereby overcoming the biasing force of the bias member and move through a plurality of angles of inclination.

3. A laser scanning apparatus according to claim 2, further comprising a sensor for sensing rotational movement of the platen assembly.

4. A laser scanning apparatus according to claim 2 wherein the laser optic assembly includes a transmitter to transmit the beam of laser light, a lens to focus the return diffuse light, and a detector to detect the focused diffuse light.

5. A laser scanning apparatus, comprising:
   a laser optic assembly transmitting a beam of laser light and detecting return diffuse light;
   a scanner assembly including a reflector positioned at an angle of inclination to reflect the beam of laser light toward objects located in a conical section and to reflect return diffuse light from the objects back to the laser optic assembly, the scanner assembly configured to move the reflector through complete rotations while simultaneously changing the angle of inclination of the reflector to reflect the beam of laser light in a spiralling path to scan the conical section, wherein the scanner assembly comprises:
   a rotatable shaft including an integral ball portion;
   a platen assembly pivotally mounted on the ball portion of the rotatable shaft, the ball portion allowing the platen assembly to pivot continuously through a plurality of angles of inclination;
   a bias member exerting a biasing force on the platen assembly to maintain the platen assembly in an initial inclined position when the shaft is stationary;
   a reflector coupled to the platen assembly, the reflector reflecting the transmitted beam of light at an initial inclined angle corresponding to the initial inclined position of the platen assembly when the shaft is stationary;

the shaft upon rotation creating a centrifugal force and causing the platen assembly and reflector to overcome the biasing force of the bias member to move the platen assembly and reflector through the plurality of angles of inclination to reflect the beam of laser light in a generally spiralled path to scan the conical section.

6. A scanning apparatus according to claim 5, further comprising a sensor for detecting rotational movement of the platen assembly.

7. A laser scanning apparatus according to claim 1 wherein the objects to be measured comprise a plant canopy.

8. A scanning apparatus according to claim 1, further comprising a hand-held, portable housing unit within which the laser scanning apparatus is disposed, the portable housing unit allowing the scanning apparatus to be rapidly moved to various locations for detecting objects.

9. A laser scanning apparatus according to claim 8, further comprising a plumbing device to ensure that the portable housing unit is level while operating the laser scanning apparatus.

10. A laser scanning apparatus according to claim 8, further comprising a control unit operatively coupled to the hand-held, portable laser scanning apparatus for storing and processing data obtained from the laser scanning apparatus.

11. A laser scanning apparatus according to claim 1, further comprising a chamber for holding desiccant material.

12. A laser scanning apparatus according to claim 1 wherein the platen assembly is coupled to the rotatable shaft by means of a ball-and-socket connection which enables movement of the shaft in two degrees of freedom.

13. A laser scanning apparatus, comprising:

means for transmitting a beam of light;

detector means for detecting return diffuse light;

reflector means mounted within a housing and positioned in the path of the beam of light for reflecting the beam toward detectable objects surrounding the laser scanning apparatus, and for reflecting return diffuse light toward the detector means;

a lens positioned in the path of the return diffuse light to focus the diffuse light onto the detector means;

scanner means for simultaneously rotating and tilting the reflector relative to the housing to cause the beam of light to scan objects located in a conical section.

14. A laser scanning apparatus, comprising:

means for transmitting a beam of light;

detector means for detecting return diffuse light;

reflector means positioned in the path of the beam of light for reflecting the beam toward detectable objects surrounding the laser scanning apparatus, and for reflecting return diffuse light toward the detector means;

a lens positioned in the path of the return diffuse light to focus the diffuse light onto the detector means;

scanner means for simultaneously rotating and tilting the reflector to cause the beam of light to scan a conical section, wherein the scanner means comprises:

a platen assembly having a top surface;

the reflector means being mounted upon the top surface of the platen assembly;

bias means for exerting a biasing force on the platen assembly to urge the platen assembly toward an initial inclined position when the shaft is stationary, wherein rotation of the shaft generates a centrifugal force which causes the platen assembly to pivot relative to the shaft thereby overcoming the biasing force of the bias means to move the platen assembly continuously through a series of inclined positions to scan the conical section.

15. A laser scanning apparatus according to claim 14, further comprising sensing means for sensing rotational movement of the platen assembly.

16. A laser scanning apparatus according to claim 13 wherein the objects to be measured comprise a plant canopy.

17. A method of scanning a conical section, comprising the steps of:

providing a reflector having a reflective surface, the reflector being mounted within a housing;

transmitting a beam of light onto the reflective surface;

reflecting the beam of light toward objects to be measured located within a conical scan section;

returning diffuse light coming from objects to be measured toward a detector;

simultaneously rotating and tilting the reflective surface relative to the housing such that the reflected beam of light moves in a spiralling path to scan the conical section.

18. A method of scanning a conical section, comprising the steps of:

providing a reflector having a reflective surface;

transmitting a beam of light onto the reflective surface;

reflecting the beam of light toward objects to be measured;

returning diffuse light coming from objects to be measured toward a detector;

simultaneously rotating and tilting the reflective surface such that the reflected beam of light moves in a spiralling path to scan the conical section;

providing a biasing force to maintain the reflector at an initial inclined position when the reflector is stationary;

rotating the reflector with sufficient rotational force to generate a centrifugal force which incrementally overcomes the biasing force and moves the reflector so as to reflect the beam of light in a spiralled path to scan the conical section.

19. The method of claim 17, further comprising the step of sensing the rotational speed of the reflector.

20. The method of claim 17, further comprising the steps of: sensing the rotational speed of the reflector; sensing the tilt angle of the reflector.

21. A laser scanning apparatus according to claim 3 wherein the sensor measures rotational speed of the platen assembly.

22. A laser scanning apparatus according to claim 3 wherein the sensor further measures the angles of inclination of the platen assembly.

23. A laser scanning apparatus according to claim 15 wherein the sensing means measures rotational speed of the platen assembly.

24. A laser scanning apparatus according to claim 15 wherein the sensing means further measures the inclined positions of the platen assembly.

25. A hand-held, portable laster scanning apparatus, comprising:

an optical assembly including a transmitter to transmit a beam of laser light and a receiver to receive return light;

a reflector rotatably mounted on a single shaft, the reflector having a flat reflective surface positioned at an angle of inclination relative to the single shaft, the reflector configured to move the reflective surface relative to the single shaft to change the angle of inclination simultaneously as the shaft rotates through a plurality of 360° rotations to project the beam of laser light through a conical section to be scanned.

26. A hand-held, portable laser scanning apparatus, comprising:

an optical assembly including a laser transmitter to transmit a beam of laser light and a receiver to receive return light;

a reflector rotatably mounted on a shaft, the reflector having a flat reflective surface positioned at an angle of inclination, the reflector configured to move the reflective surface through a plurality of known zenith and azimuth angles above a horizontal plane, the angle of inclination of the reflective surface changing as the shaft rotates to project the beam of laser light through the known zenith and azimuth angles to scan objects located within an area of a conical section above the horizontal plane.

27. A hand-held, portable laster scanning apparatus, comprising:

an optical assembly including a laser transmitter to transmit a beam of laser light and a receiver to receive return light;

a reflector rotatably mounted on a shaft, a bias member coupled to the reflector to urge the reflector toward an inclined position relative to a vertical axis, wherein rotation of the reflector generates a centrifugal force which causes angular adjustments to the angle of inclination of the reflector to allow for conical scanning.

28. A method of scanning a plant canopy in a conical section, comprising the steps of:

emitting a beam of laser light from a laser scanner;

directing the beam of laser light toward a plant canopy located in a conical section about the laser scanner, the conical section having a longitudinal axis;

moving the beam of laser light in a rotational manner about the longitudinal axis of the conical section to scan an area of the conical section about the scanner;

moving the beam of laser light through a plurality of angles relative to the longitudinal axis to scan an area of the conical section about the scanner;

detecting return diffuse light from the plant canopy within the conical section to scan the existence of plant life within the conical section.

29. The method of claim 28, further comprising the step of placing the laser scanner on the surface of the ground prior to scanning.

30. The method of claim 28, further comprising the step of recording the position of plants located within the conical section.

31. The method of claim 28, further comprising the steps of recording the azimuth and zenith positions of plants located within the conical section.

32. The method of claim 28 wherein the steps of scanning a conical section of a plant canopy at a particular position require less than ten seconds to complete.

33. A laser scanning apparatus for scanning a conical section of a plant canopy, comprising:

a plant canopy;

a laser light source;

a platen assembly operatively coupled to the laser light source, the platen assembly configured to move the laser light in zenith and azimuth angles relative to a scan position to scan a conical section of the plant canopy;

a recorder to record the zenith and azimuth angle positions of plants found within the conical section.

* * * * *